United States Patent
Agarwal et al.

(10) Patent No.: US 10,521,697 B2
(45) Date of Patent: Dec. 31, 2019

(54) LOCAL CONNECTIVITY FEATURE TRANSFORM OF BINARY IMAGES CONTAINING TEXT CHARACTERS FOR OPTICAL CHARACTER/WORD RECOGNITION

(71) Applicant: KONICA MINOLTA LABORATORY U.S.A., INC., San Mateo, CA (US)

(72) Inventors: Shubham Agarwal, Belmont, CA (US); Maral Mesmakhosroshahi, Foster City, CA (US); Yongmian Zhang, Union City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 147 days.

(21) Appl. No.: 15/721,610

(22) Filed: Sep. 29, 2017

(65) Prior Publication Data
US 2019/0102653 A1    Apr. 4, 2019

(51) Int. Cl.
*G06K 9/62* (2006.01)
*G06K 9/34* (2006.01)
(Continued)

(52) U.S. Cl.
CPC ........... *G06K 9/6235* (2013.01); *G06K 9/342* (2013.01); *G06K 9/36* (2013.01); *G06K 9/6273* (2013.01);
(Continued)

(58) Field of Classification Search
None
See application file for complete search history.

(56) References Cited

U.S. PATENT DOCUMENTS 6,332,044 B1 * 12/2001 Loce ................... G06T 5/20
                                                382/205
7,174,044 B2 *  2/2007 Ding .................. G06K 9/4609
                                                382/210
(Continued)

FOREIGN PATENT DOCUMENTS

EP        0551739 A2    7/1993

OTHER PUBLICATIONS

Graves, Alex, Marcus Liwicki, Santiago Fernández, Roman Bertolami, Horst Bunke, and Jürgen Schmidhuber. "A novel connectionist system for unconstrained handwriting recognition." IEEE transactions on pattern analysis and machine intelligence 31, No. 5 (2009): 855-868. (Year: 2009).*

(Continued)

*Primary Examiner* — Michelle M Entezari
(74) *Attorney, Agent, or Firm* — Chen Yoshimura LLP

(57) ABSTRACT

A local connectivity feature transform (LCFT) is applied to binary document images containing text characters, to generate transformed document images which are then input into a bi-directional Long Short Term Memory (LSTM) neural network to perform character/word recognition. The LCFT transformed image is a gray scale image where the pixel values encode local pixel connectivity information of corresponding pixels in the original binary image. The transform is one that provides a unique transform score for every possible shape represented as a 3×3 block. In one example, the transform is computed using a 3×3 weight matrix that combines bit coding with a zigzag pattern to assign weights to each element of the 3×3 block, and by summing up the weights for the non-zero elements of the 3×3 block shape.

15 Claims, 3 Drawing Sheets

(51) Int. Cl.
*G06K 9/36* (2006.01)
*G06K 9/66* (2006.01)
*G06T 7/45* (2017.01)
*G06N 3/04* (2006.01)

(52) U.S. Cl.
CPC .............. *G06K 9/66* (2013.01); *G06N 3/049* (2013.01); *G06T 7/45* (2017.01); *G06K 9/344* (2013.01); *G06K 2209/01* (2013.01)

(56) References Cited

U.S. PATENT DOCUMENTS

| | | | | | |
|---|---|---|---|---|---|
| 8,532,438 | B2* | 9/2013 | Yun | .......................... | G06K 9/48 382/305 |
| 8,620,078 | B1* | 12/2013 | Chapleau | ............... | G06K 9/344 382/173 |
| 9,940,534 | B1* | 4/2018 | Yang | .................... | G06K 9/4628 |
| 2007/0248267 | A1* | 10/2007 | Bar-av | ............... | G06K 9/00161 382/186 |
| 2011/0222769 | A1* | 9/2011 | Galic | ................. | G06K 9/00456 382/173 |

OTHER PUBLICATIONS

Graves et al., "Framewise Phoneme Classification with Bidirectional LSTM and Other Neural Network Architectures", Neural Networks 18.5 (2005): 602-610.

Shi et al., "Text Extraction from Gray Scale Historical Document Images Using Adaptive Local Connectivity Map", Proceedings of the 2005 Eight International Conference on Document Analysis and Recognition, 2005.

Nakai et al., "Use of Affine Invariants in Locally Likely Arrangement Flashing for Camera-Based Document Image Retrieval", in Lecture Notes in Computer Science, 2006.

Ouchtati et al., "A Set of Features Extraction Methods for the Recognition of the Isolated Handwritten Digits", in International Journal of Computer and Communication Engineering, vol. 3, No. 5, Sep. 2014.

* cited by examiner

LOCAL CONNECTIVITY FEATURE TRANSFORM OF BINARY IMAGES CONTAINING TEXT CHARACTERS FOR OPTICAL CHARACTER/WORD RECOGNITION

BACKGROUND OF THE INVENTION

Field of the Invention

This invention relates to a method for processing document images, and in particular, it relates to processing of document images for character/word recognition using artificial neural networks.

Description of Related Art

Artificial neural networks are widely used in the computer vision field to analyze images, including images of documents that contain text. One goal of document image analysis is to extract the text content, referred to as optical character recognition (OCR). Current research in computer vision in the area of document image analysis focuses on the neural network architectures and their optimization techniques, while using raw pixel values of the images as input. The input image is often binary and thus the pixel values carry relatively little information.

Current OCR models based on LSTM (Long Short Term Memory) networks, where image pixel are directly input into the network, are very sensitive to pixel positions in the image columns, and often perform poorly for even slight variations in font (e.g. training the network with images containing only a normal font and testing with images containing a bold version of the same font). This makes it hard to provide a general OCR model that can work well on unseen fonts.

LSTM, a type of recurrent neural network, has been used in various fields. For example, Alex Graves and Jürgen Schmidhuber, Framewise Phoneme Classification with Bidirectional LSTM and Other Neural Network Architectures, Neural Networks 18.5 (2005): 602-610 ("Graves et el."), describes a LSTM network and related learning algorithm.

Zhixin Shi, Srirangaraj Setlur and Venu Govindaraju, "Text Extraction from Gray Scale Historical Document Images Using Adaptive Local Connectivity Map", Proceedings of Document Analysis and Recognition, 2005, describes a method for text extraction from historical document images using adaptive local connectivity map (ALCM). In this method, the grey scale image is converted into an adaptive local connectivity map and a thresholding algorithm is applied to the ALCM to reveal the text line patterns in terms of the connected components.

SUMMARY

The present invention is directed to a method and related apparatus of document image analysis that substantially obviates one or more of the problems due to limitations and disadvantages of the related art.

An object of the present invention is to provide an improved method of analyzing document images for character/word recognition.

For the normal and bold versions of the same font, the local connection information for the boundary pixels tends to remain the same. Thus, passing local connectivity information to the neural network can enhance the recognition performance on normal to bold variation. To this end, embodiments of the present invention provide a method to encode local connectivity information in the pixel values. When provided with this additional connectivity information, the neural network is able to compute richer features and perform better on unseen fonts, especially the bold version of the normal fonts used for training the network.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method for processing a binary document image containing text characters, the method including: (a) obtaining the binary document image, the document image having a plurality of pixels, each pixel having either a first pixel value representing content of the document or a second pixel value representing background; (b) assigning the second pixel value to all pixels located on a boundary of the document image; (c) generating a transformed document image, the transformed document image being a grayscale image having a same size as the binary document image, including: (c1) for each pixel (i,j) of the document image that has the second pixel value, where i and j denote position indices of the document image respectively, assigning a fixed transform score to the pixel, (c2) for each pixel (i,j) of the document image that has the first pixel value, computing a transform score using $$T(i,j)=\Sigma_{m=-1}^{+1}\Sigma_{n=-1}^{+1}W(m,n)*P(i+m,j+n)$$

where $T(i,j)$ is the transform score of the pixel (i,j), m and n are integers and m, n$\in\{-1, 0, +1\}$, $W(m,n)$ is a 3×3 weight matrix, and $P(i+m,j+n)$ is the pixel value of pixel (i+m,j+n), wherein a center element of the 3×3 weight matrix $W(m,n)$ has a value of zero, and each one of eight non-center elements of the 3×3 weight matrix $W(m,n)$ has a value which is a different one of eight numbers $2^q$, q=0, 1, 2, . . . 7; and wherein the transform scores of all pixels of the document image form the transformed image; and (d) processing the transformed image using a bi-directional Long Short Term Memory (LSTM) neural network for character/word recognition to recognize characters or words in the transformed image.

In some embodiments, the values of the eight non-center elements of the 3×3 weight matrix are assigned using a zigzag pattern. In one embodiment, the 3×3 weight matrix $W(m,n)$ is:

$$W = \begin{bmatrix} 1 & 2 & 16 \\ 4 & 0 & 32 \\ 8 & 64 & 128 \end{bmatrix}.$$

A training method for training the neural network is also disclosed.

In another aspect, the present invention provides a method for processing a binary document image containing text characters, the method including: (a) obtaining the binary document image, the document image having a plurality of pixels, each pixel having either a first pixel value representing content of the document or a second pixel value representing background; (b) generating a transformed document image, the transformed document image being a grayscale image having a same size as the binary document image, each pixel of the transformed image representing a transform score that encodes local pixel connectivity information of the corresponding pixel in the binary document image;

and (c) processing the transformed image using a bi-directional Long Short Term Memory (LSTM) neural network for character/word recognition.

In some embodiment, in step (b), for each pixel of the binary document image having a first pixel value, the transform score is generated using a 3×3 weight matrix configured to generate a unique transform score for each of a plurality of different connectivity shapes, each connectivity shapes being represented by a 3×3 pixel block, a center pixel of the 3×3 pixel block having the first pixel and at least one other pixels having the first pixel value, and wherein each pixel of the binary document image having a second pixel value, the transform score is a fixed value. In some embodiments, the transform score for each connectivity shape is a sum, over all pixels of the 3×3 pixel block, of a product of the pixel value of the 3×3 pixel block and the corresponding element of the 3×3 weight matrix.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates connections in a binary image using a 3×3 pixel block representation.

FIG. 2 schematically illustrates connectivity shapes in a binary image using a 3×3 pixel block representation.

DETAILED DESCRIPTION OF PREFERRED EMBODIMENTS

Figure 3:
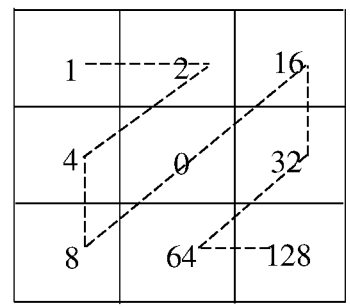
FIG. 3 schematically illustrates a method of assigning weights to a 3×3 block using a zigzag pattern according to an embodiment of the present invention.

Embodiments of this invention provide a process, referred to as local connectivity feature transform (LCFT), for transforming a binary image to encode local connectivity information before passing the image to a neural network for character/word recognition. The transformed image gives better results in character/word recognition compared to using only the binary image itself, when used as network input for cases like OCR where connectivity information is very important.

In the descriptions below, in a binary document image, background pixels (e.g. white areas of the document) are assumed to have a pixel value of zero and pixels that represent content of the document are assumed to have a pixel value of one. The method can be readily modified for a binary image where background pixels have a pixel value one and content pixels have a pixel value zero.

Figures 1, 2:
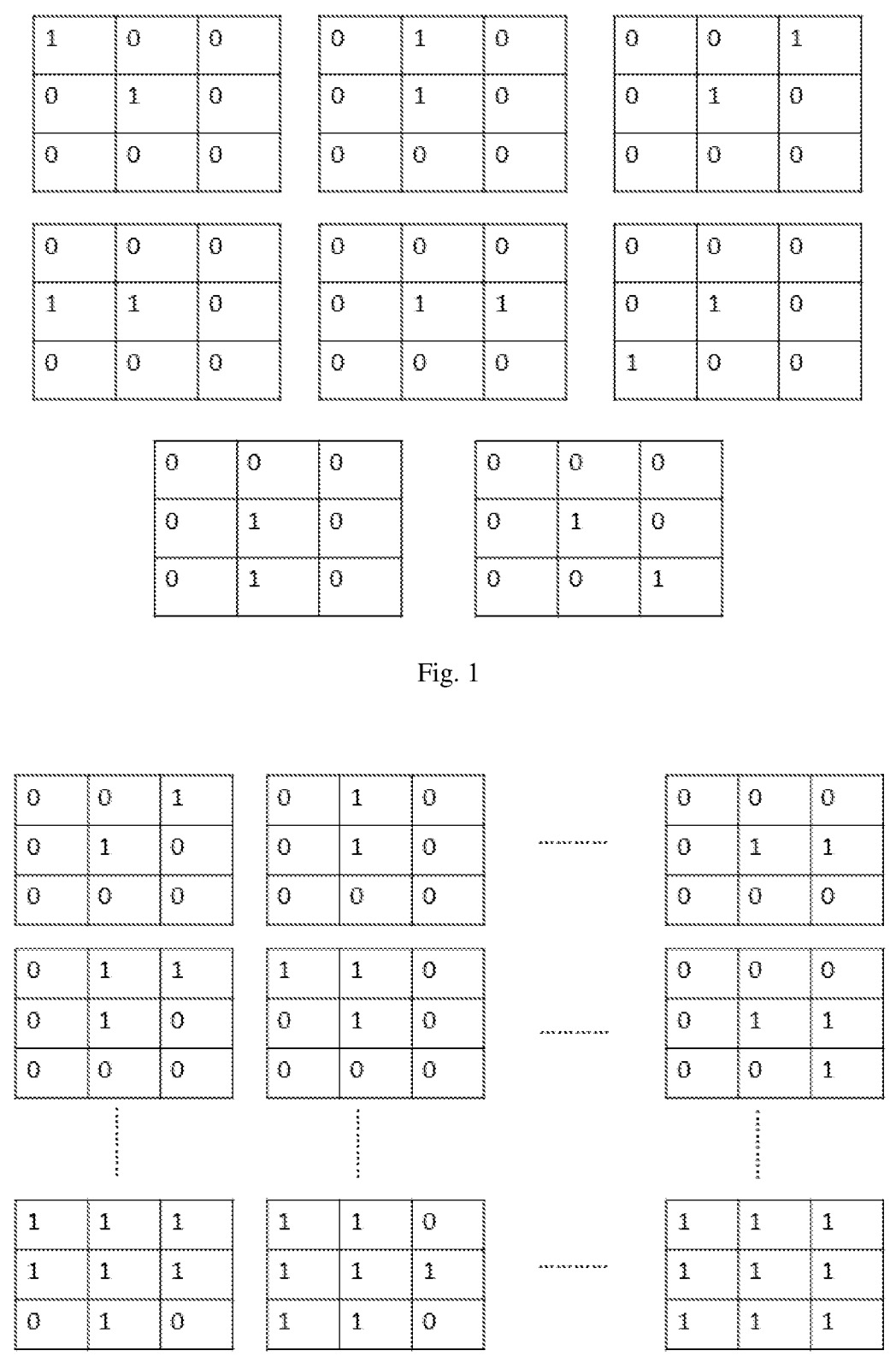

The LCFT transformation uses a 3×3 pixel block that surrounds a subject pixel (at the center) as a base for computing the connectivity feature for each non zero pixel in a binary image. A connection is defined as a pair of 1's in a 3×3 pixel block of the binary image, one being at the center (the subject pixel) and other on the periphery. FIG. 1 shows all 8 possible connections in 3×3 blocks. A connectivity shape is defined as a combination of connections. In the 3×3 pixel block representation, a connectivity shape has two or more 1's, one being at the center and others on the periphery. There are 255 possible connectivity shapes. FIG. 2 shows some possible connectivity shapes in the 3×3 block representation.

The aim of the local connectivity feature transform (LCFT) is to assign a weight to each connection and combine the weights such that each possible connectivity shape is assigned a unique score (the transform). Such a score will preserve the individual connection information along with the local connectivity shape.

In the 3×3 block representation, the weight function is a 3×3 block where each element, except for the center, is assigned a non-zero weight. The weight of the center element is zero. The transform score for each connectivity shape (3×3 pixel block where the center element and one or more other elements are 1) is the sum, over all pixels of the 3×3 pixel block, of the product of the pixel value of the 3×3 pixel block and the corresponding weight value of the 3×3 weight function.

In preferred embodiments, the eight numbers $2^q$, q=0, 1, 2, . . . 7, i.e., 1, 2, 4, . . . 128, are respectively assigned to the eight elements as their weights. The transform score for a connectivity shape represented by a 3×3 block (see FIG. 2) is the sum of the weights for all elements of the 3×3 block that have a value 1. Because the weights for different elements are different powers of 2, different connectivity shapes will have different transform scores. The 255 possible connectivity shapes are thus encoded with scores 1 to 255. This achieves an encoding of the connectivity shape. Of course, the weights may be multiplied by a common factor, which will not change the effect of the encoding.

In a preferred embodiment, the weights 1, 2, 4, . . . 128 are assigned to the eight elements of the 3×3 block of the weight function in a zigzag manner in the diagonal direction, starting from the top left element, as illustrated in FIG. 3. The use of the zigzag encoding shown in FIG. 3 is inspired by characteristics of normal handwriting where most of the characters are written from left to right and top to bottom. Other patterns can also be used, such as a zigzag pattern that is a mirror image of the one shown in FIG. 3 with respect to the upper-left to lower-right diagonal line or with respect to the upper-right to lower-left diagonal line, a zigzag in the reverse direction as that shown in FIG. 3, a spiral pattern, a column-by-column pattern, a row-by-row pattern, etc., depending upon the use-case.

In a matrix representation, the weight function can be written as a matrix W(m,n) where m, n are integers and m, n∈{−1, 0, +1}, i.e., m and n represent the row and column indices respectively with center being (0,0). The weight matrix for the zigzag example shown in FIG. 3 is (Equation 1):

$$W = \begin{bmatrix} 1 & 2 & 16 \\ 4 & 0 & 32 \\ 8 & 64 & 128 \end{bmatrix}$$

For each non boundary pixel (i,j) in the binary input image P, where i and j are the row and column indices of the image respectively, if the pixel value P(i,j) is non-zero (i.e.

it is a content pixel rather than a background pixel), the transform score T(i,j) which represents the local connectivity shape and connectivity information is computed as (Equation 2):

$$T(i,j)=\sum_{m=-1}^{+1}\sum_{n=-1}^{+1}W(m,n)*P(i+m,j+n)$$

Boundary pixels (pixels located on the outer boundary of the entire image) and pixels having a pixel value of zero (i.e. background pixels) are assigned a transform score T(i,j) of zero. The resulting transform T(i,j) is a grayscale image (8 bit pixel values) having the same size as the original image, where the pixel values represent the connectivity information. This grayscale image may be referred to as the local connectivity feature transform (LCFT) of the original image.

Figure 4:
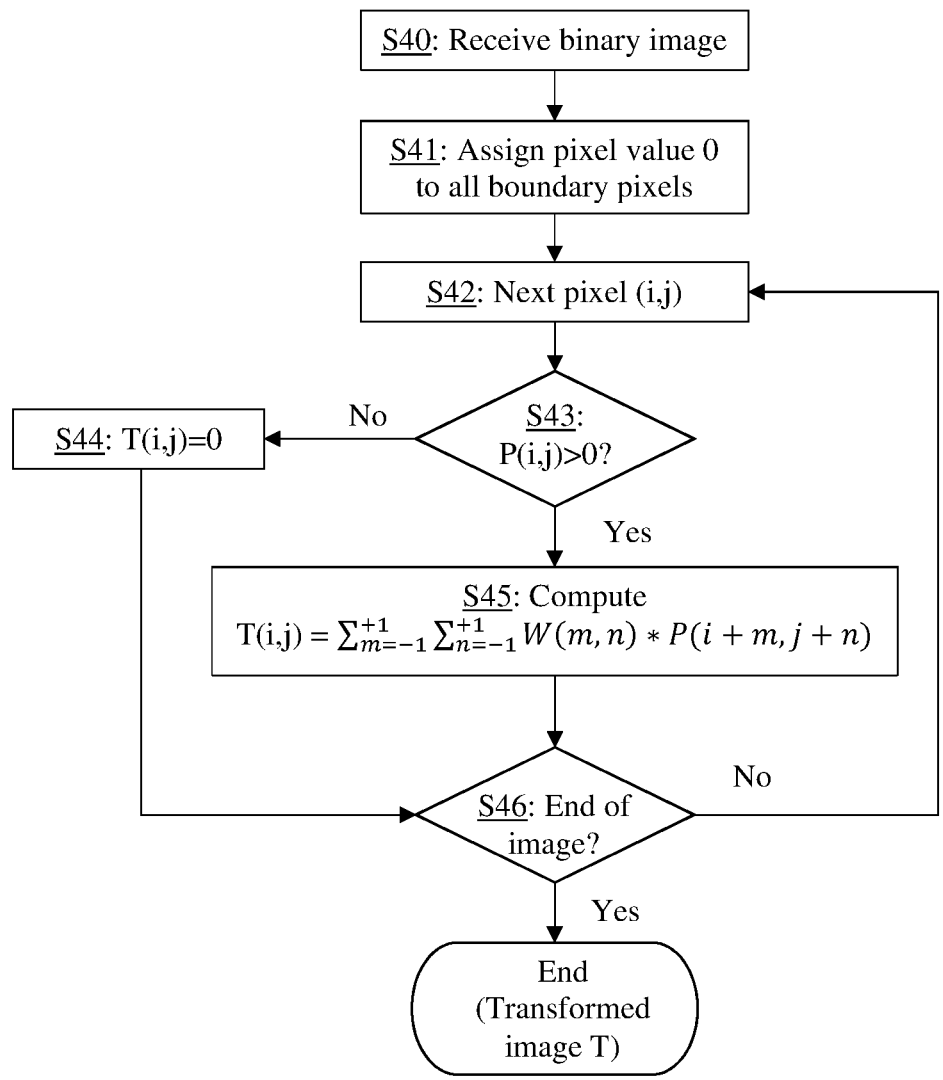
FIG. 4 schematically illustrates a method of applying local connectivity feature transform (LCFT) to a binary document image according to an embodiment of the present invention.

The algorithm for calculating the transform T of a binary image is summarized below, with reference to FIG. 4. The process starts with a binary image to be processed (step S40). All boundary pixels are assigned pixel value 0 (step S41). For each pixel (i,j) of the image (step S42), if the pixel value P(i,j) is 0 ("no" in step S43), the transform for that pixel is assigned a value 0: T(i,j)=0 (step S44). If the pixel value P(i,j) is not 0 (i.e. it is 1) ("yes" in step S43), the transform T(i,j) of that pixel is computed using Equation 2 above (step S45). After all pixels of the image are processed ("yes" in step S46), the transformed image T is obtained.

It can be seen that LCFT transforms binary images to include local pixel connectivity information. It enables local connectivity of pixels to be used for character/word recognition. The transform provides a way to encode the local connectivity information for a binary image. More specifically, the transform provides a way to uniquely score every possible connectivity shape represented by a 3×3 block surrounding a pixel. In some embodiments, a zigzag pattern in the spatial domain is used to assign close weights to nearby connections. This method combines bit coding with the zigzag pattern approach to provide connection weights. Summing up the connection weights then provides the unique transform score to each connectivity shape. This approach preserves the connection as well as connectivity shape information in the transform score. Moreover, the transform inherently removes isolated non zero pixels from the image, as their transform score will be zero.

Figure 5:
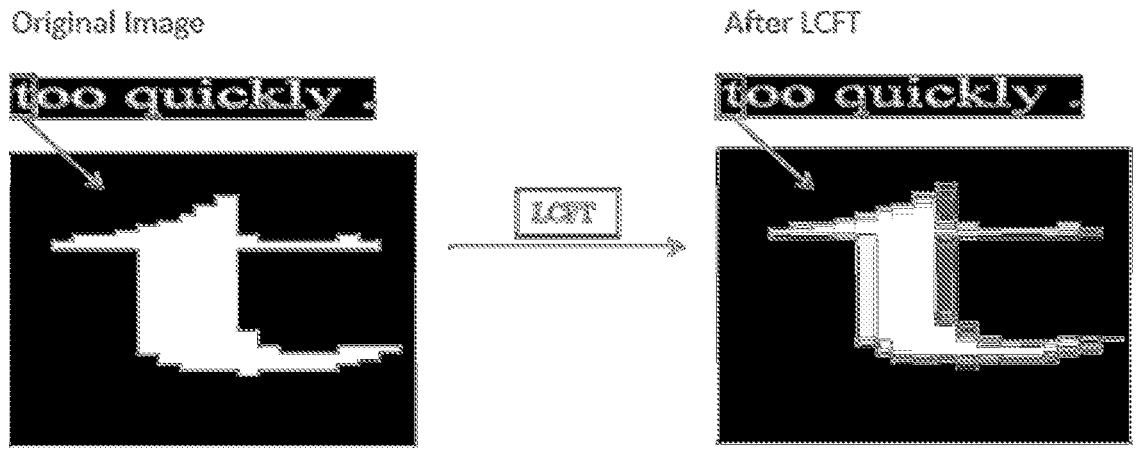
FIG. 5 schematically illustrates the effect of LCFT on exemplary text characters.

FIG. 5 shows the effect of LCFT transform on an exemplary text line. It shows the zoomed version of a character "t" before and after LCFT. As seen in this example, the input binary image is transformed into a new image with pixel values ∈[0, 255], representing the connectivity information.

The transformed image T can then be fed, in place of the binary image, into a neural network, such as a bi-directional Long Short Term Memory neural network to perform character/word recognition. The LSTM network may be, for example, the one described in the Graves et al. article cited in the Background section of this disclosure.

Figure 6:
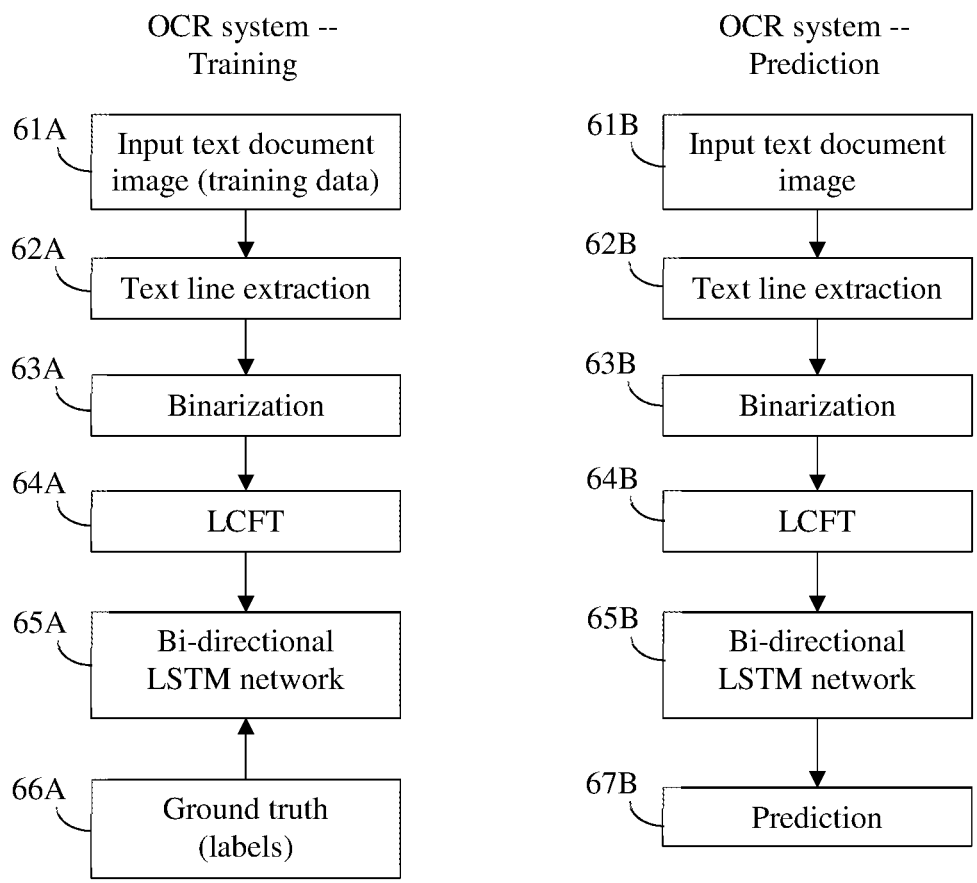
FIG. 6 schematically illustrates the processes of training a neural network and using the trained network to process document images that incorporate LCFT according to an embodiment of the present invention.

FIG. 6 schematically illustrates the OCR system training and word prediction processes. During the training process, multiple training images 61A are obtained, and text line extraction is applied to the images to extract text lines 62A (optional), and binarization is performed on the images to generate multiple binary images 63A. Any suitable methods may be used to perform the text line extraction and binarization steps. Then, local connectivity feature transform according to embodiments of the present invention is performed on the binary images to generate corresponding transformed images 64A. The transformed images, along with the ground truth 66A of the training images (also referred to as label data, which indicate the correct words to be predicted), are inputted into the bi-directional LSTM network 65A to train the network. After the network is trained, in the prediction process, document images to be processed 61B are obtained, and text line extraction 62B and binarization 63B are performed using the same methods as in the training process. Then, local connectivity feature transform is performed on the binary images to generate transformed images 64B. The transformed images are inputted into the bi-directional LSTM network 65B, which performs prediction (character/word recognition) and generates prediction result 67B.

OCR experiments were conducted using the LSTM network described in Graves et al. and the above-described training and prediction processes. In one experiment, the LSTM network was trained using the method shown in FIG. 6 on training images containing only Times New Roman (TNR) normal font text, and the trained network was used to perform prediction on test images containing both TNR normal and bold font. As a control, the LSTM network was trained using the same original training images and the same process flow but without the LCFT step 64A, and used to perform prediction on the same test images, again using the same process flow but without the LCFT step 64B. When the test images contained only TNR normal font text, both networks performed well on the test data (approximately 99.0% and 98.5% accuracies, respectively). But when the test images contained TNR bold font text, for the network trained with LCFT, the test result is significantly better than the network trained without LCFT (approximately 90.5% and 48.5% accuracies, respectively).

In another experiment, to study scalability, the LSTM network was trained using 29 different fonts, again with and without the LCFT step. For the fonts present in training, the network trained with or without LCFT performed equally well (with accuracies above 95% for most fonts, for both bold and normal fonts which are contained in the training images). However, when the test images contained bold fonts that were not present in the training images, the performance is significantly better for these fonts when the LCFT step was performed in the training and prediction processes as compared to not using LCFT (approximately 97.0% and 91.5% accuracies, respectively, for Georgia bold font, and approximately 89.0% and 44.0% accuracies, respectively, for Courier New bold font). As can be seen from these results, using LCFT significantly improves the recognition accuracy on the unseen bold fonts.

Although the above experiments are conducted for character/word recognition, the LCFT method according to embodiments of the present invention can be applied to other practical applications where the local connectivity information is important or more important than the individual pixel values.

To summarize, the LCFT method provides more relevant features to the neural network in the form of local connectivity of pixels instead of only binary pixel values. This approach has several benefits and advantages over conventional approach, such as the following: Test samples having similar connectivity information can be identified even if not present in the training. The transform removes noisy isolated non zero pixels from the image. The characters/words stained by ink smear can also be correctly recognized when LCFT is used. The transformed Image contains more useful information rather than just binary pixel values. More relevant features at the input allow the neural network to compute richer features enabling it for better prediction. The transform can be implemented in the form of a convolution (for non-zero pixels only) so computing the connections is very fast.

The methods described above, including the LCFT transform and the LSTM network and the training and prediction processes, may be implemented as software, firmware, hardware, or a combination of them, such as a computer system including processors and memories storing computer executable programs, special purpose logic circuitry such as FPGA (field programmable gate array) and ASIC (application specific integrated circuit), etc. Each of the components of the system may be implemented as a computer program module executed by processors. The system that the neural network is implemented on is generally referred to as a data processing system.

It will be apparent to those skilled in the art that various modification and variations can be made in the LCFT method and related apparatus of the present invention without departing from the spirit or scope of the invention. Thus, it is intended that the present invention cover modifications and variations that come within the scope of the appended claims and their equivalents.

What is claimed is:

1. A method for processing a binary document image containing text characters, the method comprising:
   (a) obtaining the binary document image, the document image having a plurality of pixels, each pixel having either a first pixel value representing content of the document or a second pixel value representing background;
   (b) assigning the second pixel value to all pixels located on a boundary of the document image;
   (c) generating a transformed document image, the transformed document image being a grayscale image having a same size as the binary document image, including:
      (c1) for each pixel (i,j) of the document image that has the second pixel value, where i and j denote position indices of the document image respectively, assigning a fixed transform score to the pixel,
      (c2) for each pixel (i,j) of the document image that has the first pixel value, computing a transform score using $$T(i,j)=\Sigma_{m=-1}^{+1}\Sigma_{n=-1}^{+1}W(m,n)*P(i+m,j+n)$$

where T(i,j) is the transform score of the pixel (i,j), m and n are integers and m, n ∈{−1, 0, +1}, W(m,n) is a 3×3 weight matrix, and P(i+m,j+n) is the pixel value of pixel (i+m,j+n),
   wherein a center element of the 3×3 weight matrix W(m,n) has a value of zero, and each one of eight non-center elements of the 3×3 weight matrix W(m, n) has a value which is a different one of eight numbers $2^q$, q=0, 1, 2, . . . 7; and
   wherein the transform scores of all pixels of the document image form the transformed image; and
   (d) processing the transformed image using a bi-directional Long Short Term Memory (LSTM) neural network for character/word recognition to recognize characters or words in the transformed image.

2. The method of claim 1, wherein the values of the eight non-center elements of the 3×3 weight matrix are assigned using a zigzag pattern.

3. The method of claim 1, wherein the 3×3 weight matrix W(m,n) is:

$$W = \begin{bmatrix} 1 & 2 & 16 \\ 4 & 0 & 32 \\ 8 & 64 & 128 \end{bmatrix}.$$

4. The method of claim 1, wherein the first pixel value is 1 and the second pixel value is 0, and wherein the fixed transform score is 0.

5. The method of claim 1, wherein steps (a), (b) and (c) are performed for a plurality of binary document images to generate a plurality of transformed images, and wherein step (d) includes training the bi-directional LSTM neural network for character/word recognition using the plurality of transformed image and corresponding label data.

6. The method of claim 5, wherein steps (a), (b) and (c) are performed for additional binary document images to generate additional transformed images, and wherein step (d) includes processing the additional transformed images using the trained bi-directional LSTM neural network to recognize characters/words in the additional transformed images.

7. A method for processing a binary document image containing text characters, the method comprising:
   (a) obtaining the binary document image, the document image having a plurality of pixels, each pixel having either a first pixel value representing content of the document or a second pixel value representing background;
   (b) generating a transformed document image by transforming the binary document image into the transformed document image, the transformed document image being a grayscale image having a same size as the binary document image, each pixel of the transformed image representing a transform score that encodes local pixel connectivity information of the corresponding pixel in the binary document image; and
   (c) processing the transformed image using a bi-directional Long Short Term Memory (LSTM) neural network for character/word recognition.

8. The method of claim 7, wherein in step (b), for each pixel of the binary document image having a first pixel value, the transform score is generated using a 3×3 weight matrix configured to generate a unique transform score for each of a plurality of different connectivity shapes, each connectivity shapes being represented by a 3×3 pixel block, a center pixel of the 3×3 pixel block having the first pixel value and at least one other pixels having the first pixel value, and
   wherein for each pixel of the binary document image having a second pixel value, the transform score is a fixed value.

9. The method of claim 8, wherein the transform score for each connectivity shape is a sum, over all pixels of the 3×3 pixel block, of a product of the pixel value of the 3×3 pixel block and the corresponding element of the 3×3 weight matrix.

10. The method of claim 8, wherein a center element of the 3×3 weight matrix has a value of zero, and each one of eight non-center elements of the 3×3 weight matrix has a value which is a different one of eight numbers $2^q$, q=0, 1, 2, . . . 7.

11. The method of claim 10, wherein the values of the eight non-center elements of the 3×3 weight matrix are assigned using a zigzag pattern.

12. The method of claim 8, wherein the 3×3 weight matrix is:

$$W = \begin{bmatrix} 1 & 2 & 16 \\ 4 & 0 & 32 \\ 8 & 64 & 128 \end{bmatrix}.$$

13. The method of claim 8, wherein the first pixel value is 1 and the second pixel value is 0, and wherein the fixed transform score is 0.

14. The method of claim 7, wherein steps (a) and (b) are performed for a plurality of binary document images to generate a plurality of transformed images, and wherein step (c) includes training the bi-directional LSTM neural network for character/word recognition using the plurality of transformed image and corresponding label data.

15. The method of claim 14, wherein steps (a) and (b) are performed for additional binary document images to generate additional transformed images, and wherein step (c) includes processing the additional transformed images using the trained bi-directional LSTM neural network to recognize characters/words in the additional transformed images.

* * * * *